(12) United States Patent
Naito

(10) Patent No.: US 9,748,041 B2
(45) Date of Patent: Aug. 29, 2017

(54) MULTILAYER CERAMIC CAPACITOR INCLUDING MAIN PHASE GRAINS AND A SECONDARY PHASE

(71) Applicant: Murata Manufacturing Co., Ltd., Nagaokakyo-shi, Kyoto-fu (JP)

(72) Inventor: Masahiro Naito, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 200 days.

(21) Appl. No.: 14/662,532

(22) Filed: Mar. 19, 2015

(65) Prior Publication Data

US 2015/0279564 A1    Oct. 1, 2015

(30) Foreign Application Priority Data

Mar. 27, 2014 (JP) ................................. 2014-065613
Feb. 16, 2015 (JP) ................................. 2015-027519

(51) Int. Cl.
*H01G 4/30* (2006.01)
*H01G 4/12* (2006.01)

(52) U.S. Cl.
CPC ............. *H01G 4/30* (2013.01); *H01G 4/1227* (2013.01); *H01G 4/1245* (2013.01); *H01G 4/1281* (2013.01)

(58) Field of Classification Search
CPC ...... H01G 4/30; H01G 4/1281; H01G 4/1245; H01G 4/1227
See application file for complete search history.

(56) References Cited

U.S. PATENT DOCUMENTS

| | | | | |
|---|---|---|---|---|
| 2007/0009719 A1* | 1/2007 | Naito | ............... | H01G 4/1236 428/210 |
| 2011/0228443 A1* | 9/2011 | Nishimura | ............ | C04B 35/486 361/321.1 |
| 2013/0222971 A1* | 8/2013 | Nishimura | ............ | C04B 35/486 361/301.4 |
| 2014/0043722 A1* | 2/2014 | Hirata | ............... | H01G 4/30 361/301.4 |

FOREIGN PATENT DOCUMENTS

JP         2006-173352 A      6/2006
JP   WO 2012099193 A1 *  7/2012  ........... C04B 35/486

* cited by examiner

*Primary Examiner* — David M Sinclair
(74) *Attorney, Agent, or Firm* — Keating & Bennett, LLP

(57) ABSTRACT

A dielectric ceramic layer includes main phase grains and a secondary phase. The main phase grains include a perovskite-type compound. The perovskite-type compound includes Zr, Mn and at least one element selected from the group consisting of Ti, Ca, Sr, and Ba. In the perovskite-type compound, a molar ratio z between Ti/(Zr+Ti) satisfies $0 \le z \le 0.2$, a molar ratio between Zr/(Zr+Ti) is equal to $1-z$, a molar ratio x between Sr/(Ca+Sr+Ba) satisfies $0 \le x \le 1.0$, a molar ratio y between Ba/(Ca+Sr+Ba) satisfies $0 \le y \le 0.3$, a molar ratio between Ca/(Ca+Sr+Ba) is equal to $1-x-y$, and a molar ratio m between (Ca+Sr+Ba)/(Zr+Ti) satisfies $0.95 \le m < 1.03$. The secondary phase contains segregated Mn. In a body including the dielectric ceramic layer and an internal electrode alternately stacked, the secondary phase is located inside of a second region and not located inside of a third region.

11 Claims, 3 Drawing Sheets

MULTILAYER CERAMIC CAPACITOR INCLUDING MAIN PHASE GRAINS AND A SECONDARY PHASE

BACKGROUND OF THE INVENTION

1. Field of the Invention

The present invention relates to a multilayer ceramic capacitor.

2. Description of the Related Art

Japanese Patent Laid-Open No. 2006-173352 discloses a multilayer ceramic capacitor in which a segregation layer is formed in a dielectric layer. In the multilayer ceramic capacitor described in Japanese Patent Laid-Open No. 2006-173352, the dielectric layer contains a main component containing barium titanate and a sub component containing an Mg oxide and an Si oxide, and the segregation layer mainly containing Mg and Si is formed in the dielectric layer.

The multilayer ceramic capacitor is required to be high in Q value, short in time required for charging, and high in moisture resistance.

SUMMARY OF THE INVENTION

Preferred embodiments of the present invention provide a multilayer ceramic capacitor that is high in Q value, short in time required for charging, and high in moisture resistance.

A multilayer ceramic capacitor according to a preferred embodiment of the present invention includes a body in which a dielectric ceramic layer and an internal electrode are alternately stacked and an external electrode provided on a surface of the body and electrically connected to the internal electrode. The dielectric ceramic layer contains main phase grains and a secondary phase. The main phase grains contain a perovskite-type compound. The perovskite-type compound contains Zr and Mn and further contains at least one element selected from the group consisting of Ti, Ca, Sr, and Ba. In the perovskite-type compound, a molar ratio z between Ti/(Zr+Ti) satisfies $0 \leq z \leq 0.2$, a molar ratio between Zr/(Zr+Ti) is equal to $1-z$, a molar ratio x between Sr/(Ca+Sr+Ba) satisfies $0 \leq x \leq 1.0$, a molar ratio y between Ba/(Ca+Sr+Ba) satisfies $0 \leq y \leq 0.3$, a molar ratio between Ca/(Ca+Sr+Ba) is equal to $1-x-y$, and a molar ratio m between (Ca+Sr+Ba)/(Zr+Ti) satisfies $0.95 \leq m < 1.03$. The secondary phase contains segregated Mn. The body includes a first region located in a central portion of the body and defined by a range extending in a length direction of the body by not less than 0% and less than about 5% in dimension in the length direction of the body, a range extending in a width direction of the body by not less than 0% and less than about 5% in dimension in the width direction of the body, and a range extending in a thickness direction of the body by not less than 0% and less than about 5% in dimension in the thickness direction of the body, a second region located adjacent to the first region on an outer side of the first region and defined by a range extending in the length direction of the body by not less than about 5% and not more than about 70% in dimension in the length direction of the body, a range extending in the width direction of the body by not less than about 5% and not more than about 70% in dimension in the width direction of the body, and a range extending in the thickness direction of the body by not less than about 5% and not more than about 70% in dimension in the thickness direction of the body, and a third region located adjacent to the second region on an outer side of the second region and defined by a range extending in the length direction of the body by more than about 70% and not more than about 100% in dimension in the length direction of the body, a range extending in the width direction of the body by more than about 70% and not more than about 100% in dimension in the width direction of the body, and a range extending in the thickness direction of the body by more than about 70% and not more than about 100% in dimension in the thickness direction of the body. In the body, the secondary phase is located inside of the second region and not located inside of the third region.

In a preferred embodiment of the present invention, the dielectric ceramic layer further contains Si. A condition of $0.5 \leq \alpha \leq 15.0$ and $0.1 \leq \beta \leq 10.0$ is satisfied, where α (parts by mole) and β (parts by mole) represent a content of Si and a content of Mn with respect to 100 parts by mole of (Zr+Ti) in the dielectric ceramic layer, respectively.

In a preferred embodiment of the present invention, an amount of solid solution of Mn in the main phase grains located inside of the second region is smaller than an amount of solid solution of Mn in the main phase grains located inside of the third region.

In a preferred embodiment of the present invention, the secondary phase is further located inside of the first region.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
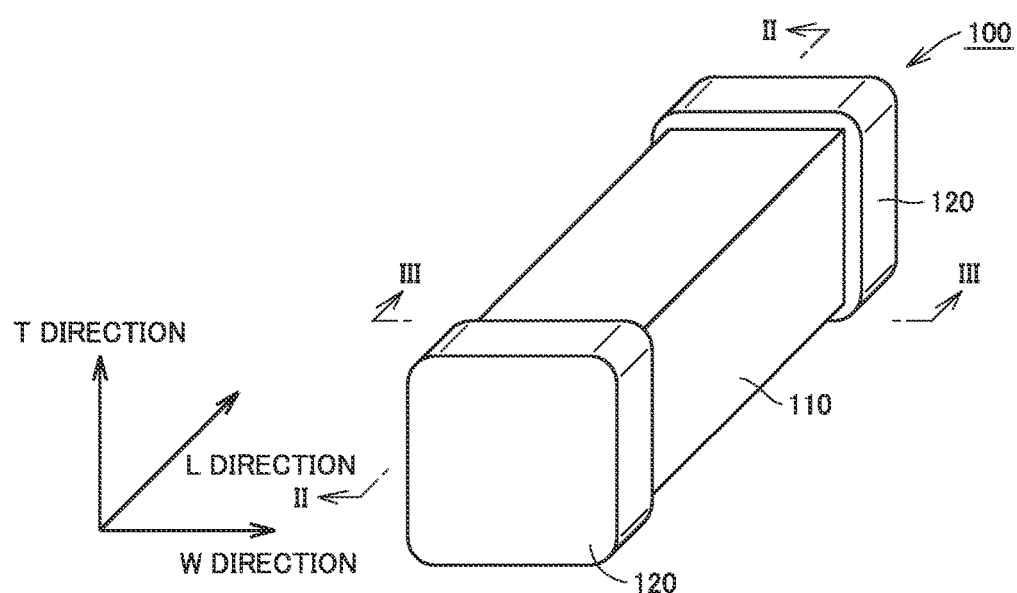
FIG. 1 is a perspective view showing appearance of a multilayer ceramic capacitor according to a preferred embodiment of the present invention.

Multilayer ceramic capacitors according to preferred embodiments of the present invention will be described hereinafter with reference to the drawings. In the description of the preferred embodiments below, the same or corresponding elements in the drawings have the same reference characters allotted and description thereof will not be repeated.

Figure 2:
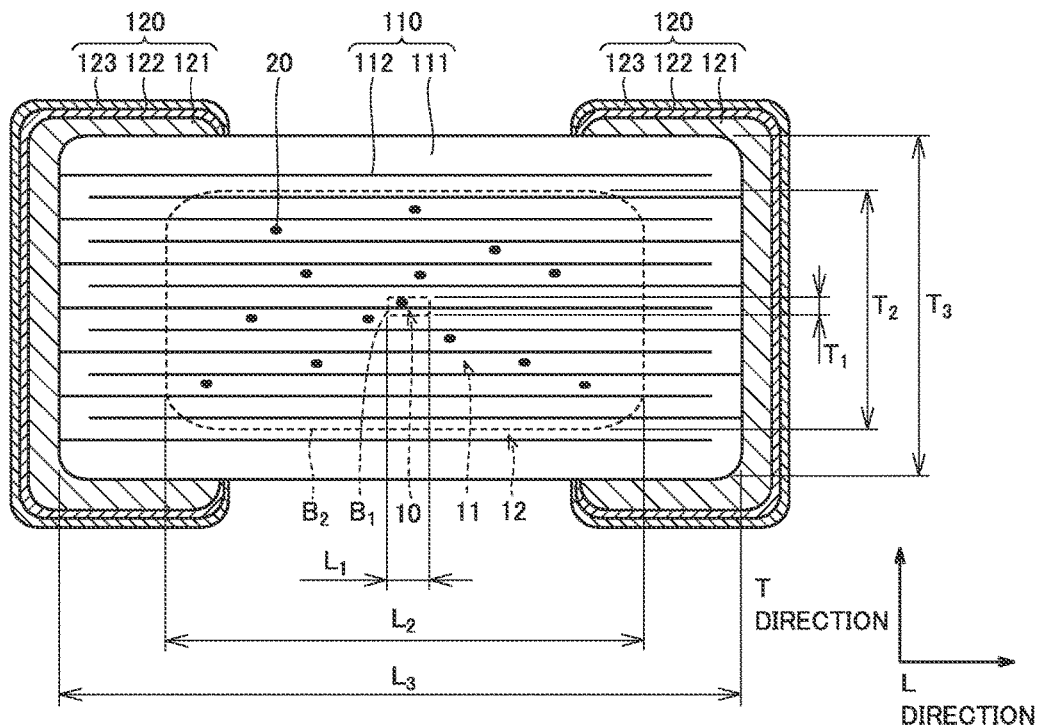
FIG. 2 is a cross-sectional view of the multilayer ceramic capacitor in FIG. 1 viewed in a direction of an arrow II-II.
Figure 3:
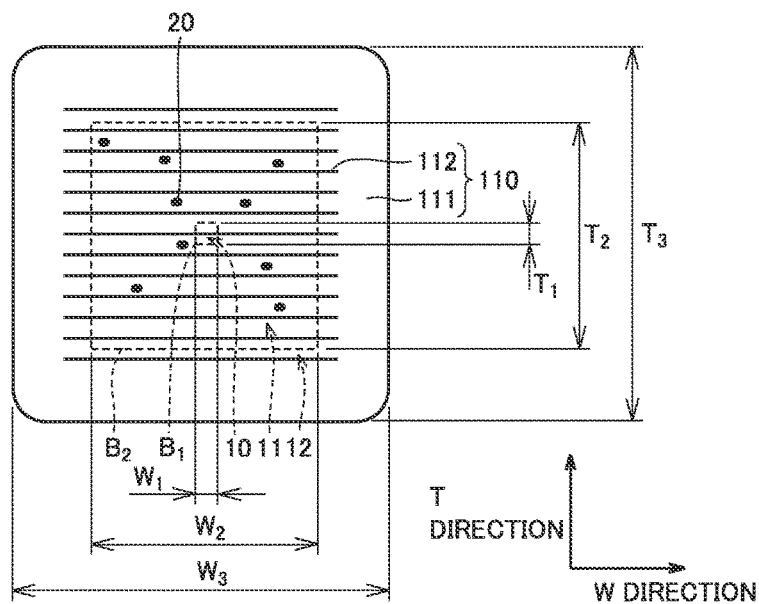
FIG. 3 is a cross-sectional view of the multilayer ceramic capacitor in FIG. 1 viewed in a direction of an arrow III-III.

FIG. 1 is a perspective view showing an appearance of a multilayer ceramic capacitor according to a preferred embodiment of the present invention. FIG. 2 is a cross-sectional view of the multilayer ceramic capacitor in FIG. 1 viewed in a direction of an arrow II-II. FIG. 3 is a cross-sectional view of the multilayer ceramic capacitor in FIG. 1 viewed in a direction of an arrow III-III. FIG. 1 illustrates a length direction, a width direction, and a thickness direction of a body 110 which will be described later as an L direction, a W direction, and a T direction, respectively. FIGS. 2 and 3 show with a dotted line, a virtual boundary line $B_1$ between a first region 10 and a second region 11 of body 110 and a virtual boundary line $B_2$ between second region 11 and a third region 12 of body 110, which will be described later.

As shown in FIGS. 1 to 3, a multilayer ceramic capacitor 100 according to a preferred embodiment of the present invention includes body 110 preferably having a parallelepiped shape in which a dielectric ceramic layer 111 and an internal electrode 112 are alternately stacked and an external electrode 120 provided on a surface of body 110 and electrically connected to internal electrode 112.

External electrode 120 is provided at each of opposing ends in the L direction of body 110. External electrode 120 is provided by baking a conductive paste onto body 110 or plating body 110. In the present preferred embodiment, external electrode 120 includes a sintered metal layer 121 provided on body 110 and containing Cu, a first plated layer 122 provided on sintered metal layer 121 and containing Ni, and a second plated layer 123 provided on the first plated layer and containing Sn.

Of internal electrodes 112 opposed to and adjacent to each other, one internal electrode 112 is electrically connected to external electrode 120 located at one end in the L direction of body 110, and the other internal electrode 112 is electrically connected to external electrode 120 located at the other end in the L direction of body 110.

Internal electrode 112 is formed preferably by printing a conductive paste containing Ni on a ceramic green sheet making up dielectric ceramic layer 111. A main material for internal electrode 112, however, is not limited to Ni, and it may be made of an alloy containing Cu, an alloy of Cu and Ni, or an alloy of Pd and Ag.

Figure 4:
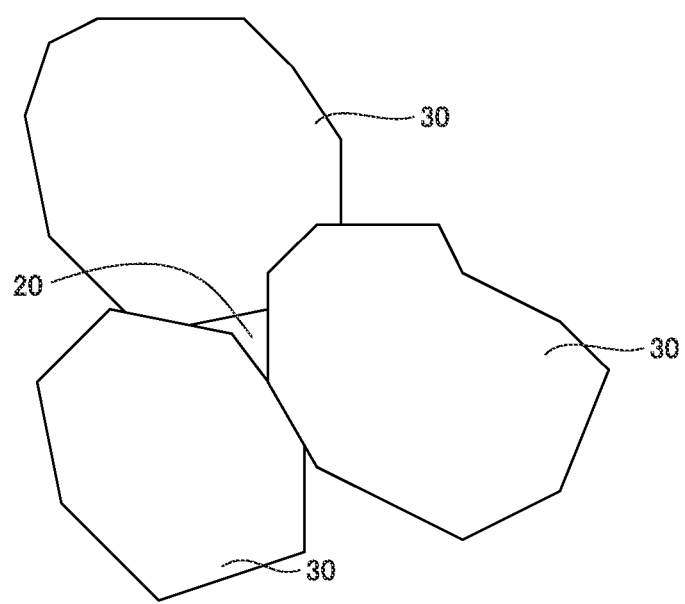
FIG. 4 is an enlarged view showing in an enlarged manner, a portion of a dielectric ceramic layer.

FIG. 4 is an enlarged view showing in an enlarged manner, a portion of the dielectric ceramic layer. As shown in FIG. 4, dielectric ceramic layer 111 contains main phase grains 30 and a secondary phase 20. Main phase grains 30 contain a perovskite-type compound. The perovskite-type compound contains Zr and Mn, and further contains at least one element selected from the group consisting of Ti, Ca, Sr, and Ba. In the perovskite-type compound, a molar ratio z between Ti/(Zr+Ti) satisfies $0 \leq z \leq 0.2$, a molar ratio between Zr/(Zr+Ti) is equal to $1-z$, a molar ratio x between Sr/(Ca+Sr+Ba) satisfies $0 \leq x \leq 1.0$, a molar ratio y between Ba/(Ca+Sr+Ba) satisfies $0 \leq y \leq 0.3$, a molar ratio between Ca/(Ca+Sr+Ba) is equal to $1-x-y$, and a molar ratio m between (Ca+Sr+Ba)/(Zr+Ti) satisfies $0.95 \leq m < 1.03$. Secondary phase 20 contains segregated Mn. Secondary phase 20 is present at a grain boundary between main phase grains 30. Si may be present in at least one manner of the following: in main phase grains 30, at the grain boundary between main phase grains 30, and in secondary phase 20.

As shown in FIGS. 2 and 3, body 110 has an outer shape that is parallelepiped or substantially parallelepiped with a dimension $L_3$ in the L direction, a dimension $W_3$ in the W direction, and a dimension $T_3$ in the T direction. Each of dimension $L_3$ in the L direction, dimension $W_3$ in the W direction, and dimension $T_3$ in the T direction of the outer shape of body 110 can be measured with a micrometer. At least any of a corner portion and a ridgeline portion of body 110 may be rounded.

Body 110 includes first region 10 located in a central portion of body 110 and defined by a range extending by not less than 0% and less than about 5% in dimension $L_3$ in the L direction, a range extending by not less than 0% and less than about 5% in dimension $W_3$ in the W direction, and a range extending by not less than 0% and less than about 5% in dimension $T_3$ in the T direction, second region 11 located adjacent to first region 10 on an outer side of first region 10 and defined by a range extending by not less than about 5% and not more than about 70% in dimension $L_3$ in the L direction, a range extending by not less than about 5% and not more than about 70% in dimension $W_3$ in the W direction, and a range extending by not less than about 5% and not more than about 70% in dimension $T_3$ in the T direction, and third region 12 located adjacent to second region 11 on an outer side of second region 11 and defined by a range extending by more than about 70% and not more than about 100% in dimension $L_3$ in the L direction, a range extending by more than about 70% and not more than about 100% in dimension $W_3$ in the W direction, and a range extending by more than about 70% and not more than about 100% in dimension $T_3$ in the T direction.

Namely, the region surrounded by boundary line $B_1$ is similar in outer shape to body 110 and an outer dimension $(L_1, W_1, T_1)$ of the region surrounded by boundary line $B_1$ corresponds to about 5% of the outer dimension $(L_3, W_3, T_3)$ of body 110.

Similarly, the region surrounded by boundary line $B_2$ is similar in outer shape to body 110 and an outer dimension $(L_2, W_2, T_2)$ of the region surrounded by boundary line $B_2$ corresponds to about 70% of the outer dimension $(L_3, W_3, T_3)$ of body 110.

First region 10 is a region on the inner side of boundary line $B_1$. Second region 11 is a region extending from boundary line $B_1$ to boundary line $B_2$. Third region 12 is a region on the outer side of boundary line $B_2$.

In body 110, secondary phase 20 is located inside of second region 11 and not located inside of third region 12. In the present preferred embodiment, secondary phase 20 is located also inside of first region 10. Definition of secondary phase 20 in the present preferred embodiment will be explained in an experimental example which will be described later.

In the present preferred embodiment, an amount of solid solution of Mn in the main phase grains located inside of second region 11 is smaller than an amount of solid solution of Mn in the main phase grains located inside of third region 12.

According to the features above, multilayer ceramic capacitor 100 is high in Q value, short in time required for charging, and high in moisture resistance.

As shown in the experimental example which will be described later, in the present preferred embodiment, dielectric ceramic layer 111 contains Si, and a condition of $0.5 \leq \alpha \leq 15.0$ and $0.1 \leq \beta \leq 10.0$ is satisfied, where $\alpha$ (parts by mole) and $\beta$ (parts by mole) represent a content of Si and a content of Mn with respect to 100 parts by mole of (Zr+Ti) in dielectric ceramic layer 111, respectively. Thus, CG characteristics (defined under the JIS standards) representing temperature characteristics of multilayer ceramic capacitor 100 are satisfied.

Experimental examples in which Examples and Comparative Examples of multilayer ceramic capacitor 100 according to the present preferred embodiment were manufactured and characteristic values thereof were compared will be described below.

Experimental Example

In the present experimental example, experiments of multilayer ceramic capacitors according to Examples 1 to 13 and Comparative Examples 1 to 10 were conducted.

Initially, powders of $CaCo_3$, $SrCo_3$, and $BaCo_3$ having purity not lower than 99% were prepared as source materials for main components. Powders of $TiO_2$ and $ZrO_2$ were also prepared. The powders of $ZrO_2$ contain a trace amount of $HfO_2$. These powders were weighed so as to achieve a composition expressed as $(Ca(1-x-y)Sr_xBa_y)m(Zr(1-z)Ti_z)O_3$.

Table 1 shows a composition of a dielectric ceramic layer in the multilayer ceramic capacitor according to each of Examples 1 to 13 and Comparative Examples 1 to 10.

TABLE 1

|  | x | y | m | z | α | β |
|---|---|---|---|---|---|---|
| Example 1 | 0.00 | 0.00 | 1.00 | 0.01 | 1.50 | 2.00 |
| Example 2 | 1.00 | 0.00 | 1.02 | 0.20 | 1.00 | 1.50 |
| Example 3 | 0.70 | 0.30 | 1.01 | 0.15 | 1.00 | 1.50 |
| Example 4 | 0.01 | 0.00 | 0.97 | 0.01 | 12.00 | 2.00 |
| Example 5 | 0.80 | 0.15 | 1.03 | 0.10 | 1.00 | 1.50 |
| Example 6 | 0.00 | 0.02 | 0.99 | 0.00 | 1.50 | 2.00 |
| Example 7 | 0.01 | 0.00 | 0.98 | 0.01 | 0.50 | 0.10 |
| Example 8 | 0.01 | 0.00 | 1.02 | 0.01 | 15.00 | 10.00 |
| Example 9 | 0.01 | 0.00 | 1.01 | 0.01 | 2.00 | 2.50 |
| Example 10 | 0.01 | 0.00 | 1.01 | 0.01 | 2.00 | 2.50 |
| Example 11 | 0.01 | 0.00 | 1.01 | 0.01 | 2.00 | 2.50 |
| Example 12 | 0.01 | 0.00 | 1.01 | 0.01 | 2.00 | 2.50 |
| Example 13 | 0.01 | 0.00 | 1.01 | 0.01 | 2.00 | 2.50 |
| Comparative Example 1 | 0.01 | 0.00 | 1.01 | 0.33 | 2.50 | 3.00 |
| Comparative Example 2 | 0.55 | 0.35 | 1.01 | 0.00 | 2.50 | 3.00 |
| Comparative Example 3 | 0.01 | 0.00 | 1.05 | 0.00 | 15.00 | 15.00 |
| Comparative Example 4 | 0.01 | 0.00 | 1.01 | 0.01 | 2.00 | 2.50 |
| Comparative Example 5 | 0.01 | 0.00 | 1.01 | 0.01 | 2.00 | 2.50 |
| Comparative Example 6 | 0.01 | 0.00 | 1.01 | 0.01 | 2.00 | 2.50 |
| Comparative Example 7 | 0.01 | 0.00 | 1.01 | 0.01 | 2.00 | 2.50 |
| Comparative Example 8 | 0.01 | 0.00 | 1.01 | 0.01 | 2.00 | 2.50 |
| Comparative Example 9 | 0.01 | 0.00 | 1.01 | 0.01 | 2.00 | 2.50 |
| Comparative Example 10 | 0.01 | 0.00 | 1.01 | 0.01 | 2.00 | 2.50 |

Powders of the main components weighed as shown in Table 1 were mixed with a wet method with the use of a ball mill. The obtained mixture was dried and thereafter broken. The powders obtained by breaking were calcined at a temperature not lower than 900° C. and not higher than 1350° C. and thereafter broken again. Source material powders of the main components were thus fabricated.

Powders of $SiO_2$ and powders of $MnCO_3$ were prepared as source material powders of sub components. The source material powders of the main components and the source material powders of the sub components were weighed to achieve a formulation shown in Table 1, where α (parts by mole) and β (parts by mole) represent a content of Si and a content of Mn with respect to 100 parts by mole of (Zr+Ti) in the dielectric ceramic layer.

The source material powders of the main components and the source material powders of the sub components weighed as shown in Table 1 were mixed with the wet method with the use of the ball mill. The obtained mixture was dried and thereafter broken. Source material powders of a base material component were thus fabricated.

To 100 parts by weight of the source material powders of the base material component, 10 parts by weight of a polyvinyl butyral based binder resin and toluene serving as a solvent were added, and they were mixed with the wet method with the use of the ball mill. Thus, ceramic slurry was prepared.

The ceramic slurry was formed into a sheet by using a lip coater, and a rectangular ceramic green sheet which was 15 cm in length, 15 cm in width, and approximately 4 μm in thickness was fabricated.

A conductive paste for forming an internal electrode was applied with a screen printing method or the like to form a prescribed pattern on some ceramic green sheets of a plurality of fabricated ceramic green sheets. The conductive paste contains 100 parts by weight of Ni powders as metal powders, 7 parts by weight of ethyl cellulose as an organic vehicle, and terpineol as a solvent.

Thus, ceramic green sheets having a conductive pattern to be an internal electrode and a ceramic green sheet not having a conductive pattern were prepared.

A mother body was fabricated by stacking a prescribed number of ceramic green sheets not having the conductive pattern, successively stacking thereon a plurality of ceramic green sheets having the conducive pattern, and further stacking thereon a prescribed number of ceramic green sheets not having the conductive pattern.

A plurality of soft bodies in a parallelepiped shape were fabricated by cutting and dividing the mother body into a prescribed shape. The soft body was heated in an atmosphere at a temperature not lower than 150° C. and not higher than 900° C. so as to burn the binder resin, and thereafter fired by heating such that a temperature increase rate of 10° C./minute was achieved until a highest temperature not lower than 1150° C. and not higher than 1350° C. was attained in a reducing atmosphere in which an oxygen partial pressure (log $PO_2$) was not lower than −9.9 and not higher than −8.5. Thus, a body having a sintered dielectric ceramic layer was fabricated.

The body was barrel-polished and an internal electrode was exposed at each of opposing end surfaces in the L direction of the body. After a Cu paste was applied to the opposing end surfaces in the L direction of the body, the body was heated at a temperature of 800° C. in a nitrogen atmosphere. Thus, a sintered metal layer composed of Cu was baked on each of the opposing end surfaces in the L direction of the body.

Thereafter, the first plated layer containing Ni was formed on the sintered metal layer by barrel plating. In addition, the second plated layer containing Sn was formed on the first plated layer by barrel plating. Thus, the external electrode was formed on each of the opposing end surfaces in the L direction of the body.

Through the process above, the multilayer ceramic capacitor 3.2 mm in length, 1.6 mm in width, and 1.6 mm in thickness, in which the dielectric ceramic layer between the internal electrodes had a thickness of 3 μm, was fabricated. The number of dielectric ceramic layers sandwiched between the internal electrodes was set to 300.

Five factors of a range of distribution of the secondary phase, a Q value, CG characteristics (defined under the JIS standards) representing the temperature characteristics, a time required for charging, and an insulation resistance IR value after an accelerated humidity load test representing moisture resistance, of the multilayer ceramic capacitors according to Examples 1 to 13 and Comparative Examples 1 to 10 fabricated as above were evaluated. Table 2 summarizes results of evaluation of the range of distribution of the secondary phase, the Q value, the temperature characteristics, the time required for charging, and moisture resistance of the multilayer ceramic capacitors according to Examples 1 to 13 and Comparative Examples 1 to 10.

TABLE 2

| | Range of Distribution of Secondary Phase in Length Direction of Body (%) | Range of Distribution of Secondary Phase in Width Direction of Body (%) | Range of Distribution of Secondary Phase in Thickness Direction of Body (%) | Q Value | Temperature Characteristics CG Characteristics | Time Required for Charging (second) | Ratio of Poor Moisture Resistance (%) |
|---|---|---|---|---|---|---|---|
| Example 1 | 32 | 28 | 31 | >10000 | good | 0.9 | 3 |
| Example 2 | 43 | 39 | 37 | >10000 | good | 0.6 | 0 |
| Example 3 | 11 | 24 | 11 | >10000 | good | 0.8 | 0 |
| Example 4 | 48 | 51 | 40 | >10000 | good | 0.8 | 2 |
| Example 5 | 54 | 68 | 57 | >10000 | good | 0.8 | 0 |
| Example 6 | 11 | 19 | 22 | >10000 | good | 0.9 | 1 |
| Example 7 | 67 | 70 | 68 | >10000 | good | 0.9 | 3 |
| Example 8 | 24 | 31 | 27 | >10000 | good | 0.8 | 1 |
| Example 9 | 5 | 9 | 13 | >10000 | good | 0.9 | 4 |
| Example 10 | 70 | 67 | 63 | >10000 | good | 1.2 | 1 |
| Example 11 | 5 | 5 | 5 | >10000 | good | 0.9 | 5 |
| Example 12 | 59 | 70 | 70 | >10000 | good | 2.3 | 0 |
| Example 13 | 51 | 44 | 51 | >10000 | good | 0.7 | 2 |
| Comparative Example 1 | 48 | 54 | 57 | >10000 | bad | 0.8 | 0 |
| Comparative Example 2 | 9 | 9 | 17 | >10000 | bad | 0.8 | 0 |
| Comparative Example 3 | 40 | 42 | 34 | >10000 | bad | 0.9 | 3 |
| Comparative Example 4 | 71 | 78 | 80 | 6000 | good | 8.3 | 0 |
| Comparative Example 5 | 65 | 71 | 72 | 7000 | good | 8.2 | 0 |
| Comparative Example 6 | 63 | 69 | 71 | 7000 | good | 6.5 | 0 |
| Comparative Example 7 | 92 | 95 | 98 | 5000 | good | 9.7 | 0 |
| Comparative Example 8 | 4 | 8 | 8 | >10000 | good | 1.1 | 27 |
| Comparative Example 9 | 1 | 4 | 5 | >10000 | good | 0.8 | 42 |
| Comparative Example 10 | 3 | 3 | 4 | >10000 | good | 0.7 | 38 |

The range of distribution of the secondary phase was evaluated with a method below. For each multilayer ceramic capacitor according to Examples 1 to 13 and Comparative Examples 1 to 10, five samples of which cross-section shown in FIG. 2 at a position approximately ½ of the dimension in the W direction of the body was polished and five samples of which cross-section shown in FIG. 3 at a position approximately ½ of the dimension in the L direction of the body was polished were prepared. A thin film of Au was formed by sputtering on the cross-section of each sample. Thereafter, the cross-section of each sample was subjected to Mn mapping analysis with the use of field emission wavelength dispersive X-ray (FE-WDX).

Mn mapping analysis was conducted with FE-WDX in a field of view which was 1500× magnification of a range of 50-μm square in a polished surface, with an acceleration voltage being set to 15 kV and a probe current being set to 100 nA.

In the present experimental example, of regions higher in intensity of Mn by at least 5 times than an average intensity of Mn in the entire field of view, a region of which circumcircle had a diameter not smaller than 0.4 μm was defined as an image of detection of the segregated secondary phase mainly containing Mn.

A mapping image of which observation magnification was 100 times was created based on a result in Mn mapping analysis. A length of a range of distribution of the secondary phase in each of the L direction, the W direction, and the T direction of the body in the mapping image of each sample was measured. The center of the range of distribution of the secondary phase was located substantially in the center of the body.

Table 2 shows a percentage occupied by the range of distribution of the secondary phase with respect to the entire body in each of the L direction, the W direction, and the T direction of the body. Table 2 shows an average range of distribution of 5 samples.

As shown in Table 2, in the multilayer ceramic capacitors according to Examples 1 to 13 and Comparative Examples 1 to 3, the secondary phase was located inside of the second region of the body and not located inside of the third region of the body.

In the multilayer ceramic capacitors according to Comparative Examples 4 to 7, the secondary phase was located also inside of the third region of the body. In the multilayer ceramic capacitors according to Comparative Examples 8 to 9, the secondary phase was located only inside of the first region of the body and not located inside of the second region of the body.

The Q value was measured, with 10 samples of each multilayer ceramic capacitor according to Examples 1 to 13 and Comparative Examples 1 to 10 being prepared. Specifically, the Q value of each sample was measured with a precision LCR meter E4980A manufactured by Agilent Technologies, with a measurement frequency being set to 1 kHz and a test signal being set to 1 Vrms. Table 2 shows an average Q value of 10 samples.

As shown in Table 2, the multilayer ceramic capacitors according to Examples 1 to 13 and Comparative Examples 1 to 3 and 8 to 10 had the Q value not smaller than 10000. The multilayer ceramic capacitors according to Comparative Examples 4 to 7 had the Q value smaller than 10000.

The CG characteristics (defined under the JIS standards) representing the temperature characteristics were measured, with 10 samples of each multilayer ceramic capacitor according to Examples 1 to 13 and Comparative Examples 1 to 10 being prepared. Specifically, a capacitance of each sample was measured in a temperature range from −50° C. to 125° C. with the precision LCR meter E4980A manufactured by Agilent Technologies, with a measurement frequency being set to 1 kHz and a test signal being set to 1 Vrms, and a temperature coefficient was calculated with the capacitance at 25° C. being defined as the reference. In Table 2, a case that even one of ten samples did not satisfy the CG characteristics (defined under the JIS standards) of 0±30 ppm/° C. is denoted as bad and a case that all of ten samples satisfied that condition is denoted as good.

As shown in Table 2, the multilayer ceramic capacitors according to Examples 1 to 13 and Comparative Examples 4 to 10 satisfied the CG characteristics. The multilayer ceramic capacitors according to Comparative Examples 1 to 3 did not satisfy the CG characteristics.

The time required for charging was measured, with 3 samples of each multilayer ceramic capacitor according to Examples 1 to 13 and Comparative Examples 1 to 10 being prepared. Specifically, an insulation resistance IR value was calculated by sampling every 0.2 msec., a current value and a voltage value at the time of application of a voltage of 200 V to the multilayer ceramic capacitor, and a time required for charging until the insulation resistance IR value became constant was found. Table 2 shows an average time required for charging of 3 samples.

As shown in Table 2, in the multilayer ceramic capacitors according to Examples 1 to 13 and Comparative Examples 1 to 3 and 8 to 10, the time required for charging was within 3 seconds. In the multilayer ceramic capacitors according to Comparative Examples 4 to 7, the time required for charging was longer than 3 seconds.

An insulation resistance IR value after the accelerated humidity load test representing moisture resistance was measured, with 100 samples of each multilayer ceramic capacitor according to Examples 1 to 13 and Comparative Examples 1 to 10 being prepared. Specifically, an insulation resistance IR value of the sample held for 250 hours under such test conditions as a temperature of 121° C., a humidity of 100% RH, an atmospheric pressure of 2 atm, and an applied voltage of 50V was measured. A sample of which insulation resistance IR value was not higher than $10^9 \Omega$ was determined as poor in moisture resistance. Table 2 shows a ratio of poor moisture resistance per 100 samples.

As shown in Table 2, a ratio of poor moisture resistance of the multilayer ceramic capacitors according to Examples 1 to 13 and Comparative Examples 1 to 7 was within 5%. A ratio of poor moisture resistance of the multilayer ceramic capacitors according to Comparative Examples 8 to 10 was higher than 5%.

As understood from the results in the experiments above, the multilayer ceramic capacitors according to Examples 1 to 13 and Comparative Examples 1 to 3, in which the secondary phase was located inside of the second region of the body and not located inside of the third region of the body, that is, an amount of solid solution of Mn in the main phase grains located inside of the second region was smaller than an amount of solid solution of Mn in the main phase grains located inside of the third region, was high in Q value and short in time required for charging, and maintained high moisture resistance.

The multilayer ceramic capacitors according to Comparative Examples 4 to 7 in which the secondary phase was located also inside of the third region of the body was low in Q value and required a long time for charging. This may be because solid solution of Mn in the main phase grains is insufficient in the third region of the body and hence ceramics is reduced during sintering. Therefore, a leakage current during charging increased, and the time required for charging was long. In addition, since the insulation resistance IR value lowered, the Q value was low.

The multilayer ceramic capacitors according to Comparative Examples 8 to 9 in which the secondary phase was located only inside of the first region of the body and not located inside of the second region of the body was low in moisture resistance. This may be because almost complete solid solution of Mn in the main phase grains in the first region and the second region of the body takes place, and hence a large amount of oxygen vacancy is formed in the main phase grains owing to an acceptor function of Mn and a crystal structure of the main phase grains is unstable. Therefore, ceramics was eroded by a corrosive atmosphere in the accelerated humidity load test, the insulation resistance IR value easily lowered, and a ratio of poor moisture resistance was high.

As shown in Tables 1 and 2, the multilayer ceramic capacitors according to Examples 1 to 13, in which the dielectric ceramic layer contained such main phase grains 30 that molar ratio z between Ti/(Zr+Ti) satisfied 0≤z≤0.2, the molar ratio between Zr/(Zr+Ti) was equal to 1−z, molar ratio x between Sr/(Ca+Sr+Ba) satisfied 0≤x≤1.0, molar ratio y between Ba/(Ca+Sr+Ba) satisfied 0≤y≤0.3, the molar ratio between Ca/(Ca+Sr+Ba) was equal to 1−x−y, and molar ratio m between (Ca+Sr+Ba)/(Zr+Ti) satisfied 0.95≤m<1.03 in the perovskite-type compound expressed as $(Ca_{(1-x-y)}Sr_xBa_y)m(Zr_{(1-z)}Ti_z)O_3$ and contained Si and Mn so as to satisfy the condition of 0.5≤α≤15.0 and 0.1≤β≤10.0, where α (parts by mole) and β (parts by mole) represented a content of Si and a content of Mn with respect to 100 parts by mole of (Zr+Ti), respectively, satisfied also the CG characteristics.

It was confirmed from the results of the experiments above that the multilayer ceramic capacitor according to the present preferred embodiment is high in Q value, short in time required for charging, and high in moisture resistance.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor, comprising:
a body including a dielectric ceramic layer and an internal electrode alternately stacked; and
an external electrode provided on a surface of the body and electrically connected to the internal electrode; wherein
the dielectric ceramic layer includes main phase grains and a secondary phase;
the main phase grains include a perovskite-type compound;
the perovskite-type compound includes Zr, Mn, and at least one element selected from the group consisting of Ti, Ca, Sr, and Ba;
in the perovskite-type compound, a molar ratio z between Ti/(Zr+Ti) satisfies 0≤z≤0.2, a molar ratio between Zr/(Zr+Ti) is equal to 1−z, a molar ratio x between Sr/(Ca+Sr+Ba) satisfies 0≤x≤1.0, a molar ratio y between Ba/(Ca+Sr+Ba) satisfies 0≤y≤0.3, a molar ratio between Ca/(Ca+Sr+Ba) is equal to 1−x−y, and a molar ratio m between (Ca+Sr+Ba)/(Zr+Ti) satisfies 0.95≤m<1.03;

the secondary phase includes segregated Mn;

the body includes a first region located in a central portion of the body and defined by a range extending in a length direction of the body by not less than 0% and less than about 5% in dimension in the length direction of the body, a range extending in a width direction of the body by not less than 0% and less than about 5% in dimension in the width direction of the body, and a range extending in a thickness direction of the body by not less than 0% and less than about 5% in dimension in the thickness direction of the body, a second region located adjacent to the first region on an outer side of the first region and defined by a range extending in the length direction of the body by not less than about 5% and not more than about 70% in dimension in the length direction of the body, a range extending in the width direction of the body by not less than about 5% and not more than about 70% in dimension in the width direction of the body, and a range extending in the thickness direction of the body by not less than about 5% and not more than about 70% in dimension in the thickness direction of the body, and a third region located adjacent to the second region on an outer side of the second region and defined by a range extending in the length direction of the body by more than about 70% and not more than about 100% in dimension in the length direction of the body, a range extending in the width direction of the body by more than about 70% and not more than about 100% in dimension in the width direction of the body, and a range extending in the thickness direction of the body by more than about 70% and not more than about 100% in dimension in the thickness direction of the body; and in the body, the secondary phase are located inside of the second region and not located inside of the third region.

2. The multilayer ceramic capacitor according to claim 1, wherein
the dielectric ceramic layer further includes Si; and
a condition of $0.5 \leq \alpha \leq 15.0$ and $0.1 \leq \beta \leq 10.0$ is satisfied, where α (parts by mole) and β (parts by mole) represent a content of Si and a content of Mn with respect to 100 parts by mole of (Zr+Ti) in the dielectric ceramic layer, respectively.

3. The multilayer ceramic capacitor according to claim 2, wherein an amount of solid solution of Mn in the main phase grains located inside of the second region is smaller than an amount of solid solution of Mn in the main phase grains located inside of the third region.

4. The multilayer ceramic capacitor according to claim 1, wherein the secondary phase is further located inside of the first region.

5. The multilayer ceramic capacitor according to claim 1, wherein the body has a parallelepiped or substantially parallelepiped shape.

6. The multilayer ceramic capacitor according to claim 1, wherein the external electrode is provided at each of opposing ends of the body.

7. The multilayer ceramic capacitor according to claim 1, wherein the external electrode is made of conductive paste or plated material.

8. The multilayer ceramic capacitor according to claim 1, wherein the external electrode includes a sintered metal layer, a first plated layer on the sintered metal layer, and a second plated layer on the first plated layer.

9. The multilayer ceramic capacitor according to claim 1, wherein Si is present at a grain boundary between the main phase grains.

10. The multilayer ceramic capacitor according to claim 1, wherein Si is present in the main phase grains.

11. The multilayer ceramic capacitor according to claim 1, wherein Si is present in the secondary phase.

\* \* \* \* \*